US007582862B2

(12) United States Patent
Hartmer

(10) Patent No.: US 7,582,862 B2
(45) Date of Patent: Sep. 1, 2009

(54) ION SOURCE FOR ELECTRON TRANSFER DISSOCIATION AND DEPROTONATION

(75) Inventor: Ralf Hartmer, Hamburg (DE)

(73) Assignee: Bruker Daltonik GmbH, Bremen (DE)

( * ) Notice: Subject to any disclaimer, the term of this patent is extended or adjusted under 35 U.S.C. 154(b) by 134 days.

(21) Appl. No.: 11/873,670

(22) Filed: Oct. 17, 2007

(65) Prior Publication Data

US 2008/0093546 A1 Apr. 24, 2008

(30) Foreign Application Priority Data

Oct. 18, 2006 (DE) ....................... 10 2006 049 241

(51) Int. Cl.
*H01J 49/42* (2006.01)
*B01D 59/44* (2006.01)

(52) U.S. Cl. ....................... 250/282; 250/292; 250/293; 250/281; 250/283

(58) Field of Classification Search ................. 250/282, 250/292, 281, 283, 293
See application file for complete search history.

(56) References Cited

U.S. PATENT DOCUMENTS

| | | | | |
|---|---|---|---|---|
| 7,456,397 | B2 * | 11/2008 | Hartmer et al. | 250/292 |
| 2005/0199804 | A1 | 9/2005 | Hunt et al. | |
| 2008/0093547 | A1 * | 4/2008 | Hartmer et al. | 250/283 |
| 2008/0135747 | A1 * | 6/2008 | Brekenfeld | 250/283 |

FOREIGN PATENT DOCUMENTS

| | | | |
|---|---|---|---|
| GB | 2 423 865 | A | 9/2006 |
| WO | WO 2006/042187 | A2 | 4/2006 |

* cited by examiner

*Primary Examiner*—Nikita Wells

(57) ABSTRACT

In mass spectrometric analysis equipment, highly charged analyte fragment ions are obtained by electron transfer dissociation of highly charged analyte ions by radical anions and the dissociation products are then deprotonated with non-radical anions. Both the radical anions for electron transfer dissociation and the non-radical anions for deprotonation are produced in a single ion source from a single substance, or a single mixture of substances by adjusting the electrical operating parameters of the ion source.

20 Claims, 4 Drawing Sheets

ION SOURCE FOR ELECTRON TRANSFER DISSOCIATION AND DEPROTONATION

BACKGROUND

The invention relates to the deprotonation of multiply charged fragment ions obtained by electron transfer dissociation of multiply charged analyte ions.

A common method of generating molecular ions for mass-spectrometric analysis of biomolecules is electrospray ionization (ESI), which ionizes molecules under atmospheric pressure outside the mass spectrometer. These ions are then channeled through inlet systems of a known type into the mass spectrometer's vacuum system, and on to the mass analyzer. There the ions are separated by mass and measured, yielding a mass spectrum of the biomolecule ions.

Electrospray ionization causes almost no fragmentation, and the ions are substantially those of the protonated molecules; due to their protonation, they are frequently referred to as "pseudomolecular ions". Nevertheless, multiple protonation from electrospraying usually results in multiply charged ions of the molecules: doubly and triply charged ions for smaller molecules such as peptides, while for larger biomolecules, such as proteins, with molecular masses in the range between 5 and 20 kilodaltons, the ions may carry up to 10 or even 30 charges.

The absence of almost any fragmentation in the ionization process limits the information from the mass spectrum to the mass of the molecule. In most cases the enormous variety of biomolecules means that this is inadequate for the purposes of identifying the substance. The mass spectra do not contain further information about internal molecular structures which could be used to identify the substance under investigation. This information can only be obtained in special tandem mass spectrometers by recording the mass spectra of the fragment ions, which are obtained by fragmenting the molecular ions. A variety of methods are available for the fragmentation, and these depend strongly on the type of mass spectrometer being used.

If possible, fragmentation is carried out on parent ions with double or triple charges, as these have a very high yield of fragment ions and deliver easily evaluated fragment ion spectra. The spectra of these fragment ions are also known as "daughter ion spectra" of the parent ions concerned. It is also possible to measure "granddaughter ion spectra", which are the fragment ion spectra of selected daughter ions. The structures of the fragmented ions can be read from these daughter (and granddaughter) ion spectra; for instance, it is possible (although somewhat difficult) to determine at least parts of the sequence of amino acids in a peptide from these spectra.

Mass spectrometers with RF ion traps have features that make them interesting for many types of analysis. In particular, they can isolate selected types of ion (the "parent ions") in the ion trap and fragment them. The isolation of one type of ion means that all the uninteresting ion types are removed from the ion trap by strong resonant excitation or other measures, so that only the parent ions remain. These parent ions, in other words the interesting analyte ions, are fragmented following the conventional method, by weak resonant excitation of what are known as the "secular" ion oscillations, using a dipolar alternating voltage, which results in many impacts with the collision gas, but without removing the ions from the ion trap. The ions can accumulate energy through these impacts, finally resulting in decomposition of the ions and the creation of fragment (or daughter) ions. Until a few years ago, this collision-induced dissociation (CID) was the only known method of fragmentation in ion traps.

Three-dimensional (3D) Paul ion traps consist of a ring electrode and two end cap electrodes. As a general rule, the RF voltage is applied to the ring electrode, but other operating modes are possible. Ions of both polarities, i.e. positive or negative ions, can be held in the quadrupole RF field inside the ion trap for analysis by mass spectrometry. The ion traps can be used as mass spectrometers by ejecting the stored ions—selected according to mass—and measuring them in a so called "ion scan" with secondary electron multipliers. Several different ion scan methods are known for the ion ejection, but these will not be considered in any further detail here.

Linear ion traps (also known as 2D ion traps because the electrical fields in the interior only change in two dimensions) consist of several pairs of pole rods supplied with RF voltage, and end electrodes whose potentials can repel the ions. Special steps must be taken if it is desired to store both positive and negative ions at the same time; RF voltages, for instance, can be used to generate pseudopotentials that repel ions of both polarities. Two-dimensional ion traps with four pole rods form an internal quadrupole field, and can be used as mass analyzers in a similar way as 3D ion traps. Here again there are different scanning procedures, such as those using the mass-selective ejection of ions through slots in the pole rods, or through diaphragms at the end of the rod system.

Recently, a method has become known for the fragmentation of ions in ion traps that delivers the same kind of fragmentation as the now well-known electron capture dissociation (ECD) but by means of different reactions: electron transfer dissociation (ETD). This fragmentation process can be performed in ion traps by introducing suitable negative ions in addition to the stored analyte ions. Methods of this type have been described in the published patent applications DE 10 2005 004 324.0 (R. Hartmer and A. Brekenfeld) and US 2005/0199804 A1 (D. F. Hunt et al.). The fragment ions here (as in the case of electron capture) belong to what are known as the c and z series, and are therefore very different from the fragment ions of the b and y series, which are obtained by collision-induced fragmentation. The fragments in the c and z series have significant advantages for the identification of proteins and for determining the amino acid sequence from the mass-spectrometric data, not least because ETD fragment ion spectra can extend down to smaller masses than collision-induced fragment ion spectra.

It is most favorable if both collision-induced fragment ion spectra and ETD fragment ion spectra are recorded, as comparison of the two spectra permits the ion signals to be assigned immediately to the c/b series or to the z/y series. This is because there are fixed mass differences between c-ions and b-ions, as there are between z-ions and y-ions, which enable easy identification.

This fragmentation by electron transfer in reactions between multiply charged analyte cations and suitable anions is a favorable alternative to electron capture fragmentation (ECD), which is very difficult to carry out in ion traps because the RF fields scarcely permit the entry of low-energy electrons. RF ion traps can, however, store both positive and negative ions for the necessary electron transfer reactions in their pseudopotential wells.

The presence of a collision gas in the ion trap has the effect of damping the existing oscillations (the "secular" oscillations) of the ions in the pseudopotential well; the ions then collect after a few milliseconds as a small cloud in the center of the ion trap. In the case of a usual ion trap with typical ion content of a few tens of thousands of ions, the cloud has a diameter of about one millimeter; it is determined by equilibrium between the restoring force of the pseudopotential and the repulsive Coulomb forces between the ions. The internal dimensions of the 3D ion traps are generally characterized by a distance of about 14 millimeters between the end caps, the diameter of the ring electrode being somewhere between 14 and 20 millimeters. In linear quadrupole ion traps, the distance between opposing pole rods is generally around 8 millimeters; greater distances can, however, yield good 2D ion traps, particularly for linear hexapole or octopole ion traps.

The fragmentation of ions by electron transfer in an RF ion trap is created in a very simple manner by reactions between multiply charged positive ions and suitable negative ions. Suitable negative ions are often radical anions, such as those of fluoranthene, fluorenone, anthracene or other polyaromatic compounds. In radical anions, the chemical valences are not saturated, so facilitating the easy donation of electrons. They are generated in NCI (negative chemical ionization) ion sources, most probably through simple electron capture or through electron transfer. In principle, the design of NCI ion sources is the same as for chemical ionization (CI ion sources), but they are operated in a different way in order to obtain large quantities of low-energy electrons. NCI ion sources are also referred to as electron attachment ion sources.

The electron transfer reactions either result immediately in the desired fragmentation or, in an essentially undesirable manner, in the formation of radical cations of the analyte molecules. Although these radical cations have acquired an electron, they have not lost protons, and have therefore also not decomposed. These radical cations are inherently metastable, and therefore decompose over a sufficiently long period, thereby remaining intact in the ion trap for a relatively long time. They can very easily be subjected to further collision-induced fragmentation through gentle resonant excitation of their secular oscillations. This creates the fragment ions characteristic of electron transfer dissociation (ETD), and not the fragment ions typical of (CID) collision-induced fragmentation The ETD fragment ion spectra are very easy to evaluate if they are produced from doubly charged parent ions. The evaluation of ETD fragment ion spectra from triply charged parent ions is also relatively simple, as doubly charged fragment ions are relatively easy to recognize by the differences in mass of their isotope patterns. This is not the case when highly charged parent ions having, for instance, ten or twenty charges, are subjected to this fragmentation procedure. The yield of fragment ions is then very high, but the fragment ion spectrum is so complex that it is scarcely possible to evaluate it, particularly as the isotope patterns in ion traps can no longer be resolved by mass, and therefore the level of charge cannot be established.

Larger molecules, proteins in particular, yield multiply charged ions in electrospray ion sources; as a rule of thumb, we can assume that every increase of 1500 Daltons in mass results in an average increase in charge of one elementary charge unit. A protein with a mass of 10000 Daltons has therefore gathered about 15 protons at the peak of the charge distribution, although in most cases there is a broad distribution of ions with various numbers of charges. Doubly or triply charged ions occur with vanishingly small frequencies, and therefore cannot practicably be used for generating the fragment ions; for these reasons, the use of fragmentation by electron transfer comes up against great difficulties with protein molecules in the molecular mass range between five and 50 kilodaltons, even though the highly charged analyte ions can be dissociated by electron transfer very effectively. In most cases, the fragment ions created in this way, above all the heavy fragment ions, are themselves also highly charged.

It has long been known that ions with multiple charges can be converted by continued deprotonation ("charge stripping") into ions with single or low numbers of charges. This is done very easily by proton transfer from the ions with multiple positive charges to special kinds of negatively charged ions, most particularly non-radical anions, which are thereby neutralized. The reaction cross-sections for these proton transfer reactions are proportional to the square of the number of proton charges on an ion; the deprotonation therefore happens very quickly for highly charged ions, while the reaction speed is sharply reduced when the ions have lower charges. If, for instance, the supply of negative reactant ions for deprotonation is stopped when singly charged ions are reached, the measurements in the mass analyzer will demonstrate relatively simple mass spectra, as these now contain almost exclusively the signals of singly charged ions. Stopping the deprotonation reactions at an earlier stage, however, for instance when only mixtures of fragment ions with up to four protons remain, also leads to interpretable mass spectra if isotope resolution for scanning is achieved in the mass spectrometer used.

This effect can also be used when electron transfer dissociation is applied to proteins: after storing highly charged ions of the proton molecules, collision-induced fragmentation is produced by resonant excitation of the secular oscillations, or ETD fragmentation is generated by supplying suitable radical anions; after this, non-radical anions are supplied for deprotonation until the desired reduction in the charge states of the fragment ions has occurred. This yields easily interpretable fragment ion mass spectra.

If this method is applied to the deprotonation of ETD fragment ions it is unfavorable that, in principle, three different ion sources are required: one ion source for the analyte cations with multiple positive charges (usually electrospray), one ion source for generating the radical anions for the ETD reactions, and one ion source for the non-radical anions for deprotonation. If only one ion source is used to generate both kinds of anions, it is necessary, under the constraints of the technology known so far, to supply it with two different kinds of substance. The two substances can be supplied one after the other, but this is necessarily time-consuming and inconsistent with a rapid sequence of measurements. It can, alternatively, be done simultaneously, but this requires an additional selection of the desired ion types requiring additional procedures and equipment.

SUMMARY

The invention consists of a method for operating an electron attachment ion source (NCI) with which, simply by changing the electrical operating parameters of the ion source, it is possible to generate the radical anions for ETD fragmentation of the analyte ions as well as the rather different non-radical anions for deprotonation from the same substance or from the same mixture of substances. In addition, a simple method for the operation of a mass spectrometer for the measurement of ETD fragment ion spectra while applying this operating procedure to the NCI ion source is provided.

The delivery primarily of one or the other type of anions is, surprisingly, possible in a simple electron capture ion source (NCI ion source or electron attachment ion source) to which, in addition to fluoranthene, methane is also supplied as a thermalization gas, by changing the electrical operating voltages, in particular by changing the voltage for the extraction of ions from the ion source. This permits either the radical anions for electron transfer dissociation or the non-radical anions for deprotonation to be supplied, or for both to be delivered simultaneously. Operation is preferably carried out with a single substance (such as fluoranthene), but it is also possible to use a mixture of substances. Instead of the methane, it is also possible to use other gases that release hydrogen radicals when ionized in order to thermalize the electrons (and possibly to supply radical hydrogen).

Our investigations have shown that it is thus possible, using an ion source for electron attachment, in other words an ion source for negative chemical ionization, to generate either the radical anions $M^{*-}$ or the non-radical anions $(M+H)^-$ from one substance M. Each of the two anion types can be supplied either almost exclusively, or at least with an overwhelming proportion of the selected type. If the exclusive creation or extraction of one type of ion is not entirely successful, small residues of the other type of ion may be tolerated by the process; alternatively it is also possible for the unrequired ion type to be removed in the ion guide or during the process of storage in the ion trap, by the application of known methods for mass separation.

The procedure for measuring easily interpretable ETD fragment ion spectra generated from larger biomolecules can, for instance, comprise the following sequence: first, the mixture of highly charged positive analyte ions is introduced into the RF ion trap; if necessary, the desired parent ions are isolated out of this mixture. The parent ions involved here can consist of a single type of ion with a uniform charge level, for example only ions with precisely ten charges, or may consist of a mixture of ions of the same analyte molecule but with a number of charge levels. By means of a controlled proton transfer reaction, a uniform charge level can be "cultivated" for the parent ions from a mixture of ions with a number of charge levels. The radical anions for the electron transfer dissociation—usually in high excess—are then introduced. If enough of the parent ions (30 or 50 percent, for instance) have been fragmented, usually after a period of between 5 and 30 milliseconds, the process is halted in order to minimize the formation of internal fragments caused by double fragmentation. The electron transfer reactions are interrupted by rapidly removing the remaining radical anions. This can be achieved by strong resonant excitation, or by changing the RF amplitude to produce ejection through instability. The electron capture ion source is then switched over to deliver non-radical anions, and these ions are supplied to the ion trap. If the desired mixture of ions with a low, or even single, charge is achieved without having used up all the non-radical anions, the excess non-radical anions are removed. Measurements taken on the remaining ions with a mass spectrometer yield an easily interpretable mass spectrum from the fragment ions.

It is, however, also possible for the processes of electron transfer dissociation and of deprotonation to be carried out in the reverse sequence or simultaneously. In the latter case, the electron attachment ion source delivers a mixture with a specified ratio of both types of ion.

The fragment ion spectrum can be measured using the ion trap as a mass analyzer, but can also be carried out in other types of mass analyzer if the ion trap is coupled with them to form a mass spectrometer.

DETAILED DESCRIPTION

Figure 1:
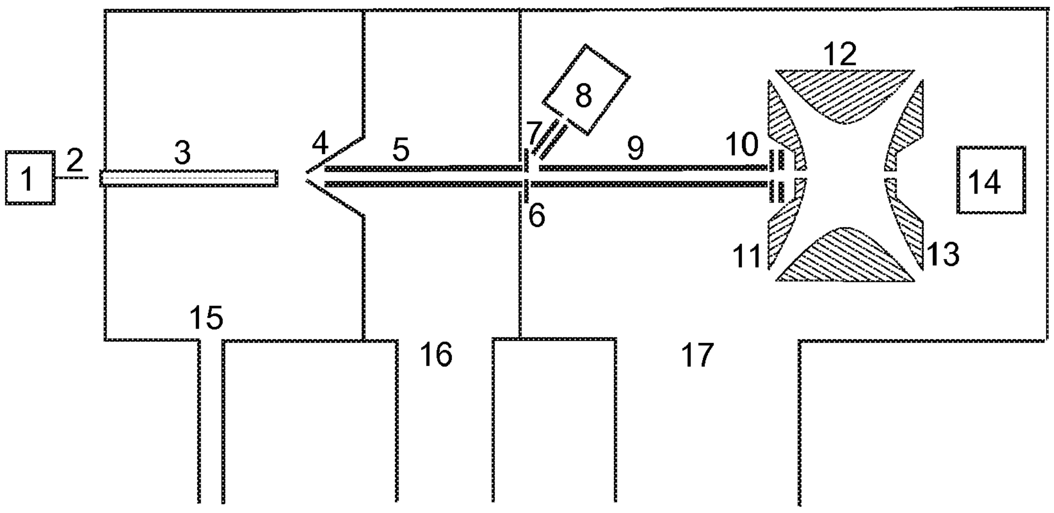
FIG. 1 illustrates an arrangement of an ion trap mass spectrometer for carrying out a method according to this invention, with an electrospray ion source (1, 2), an electron attachment ion source (8) for the generation of negative ions, and a 3D ion trap with two end cap electrodes (11, 13) and a ring electrode (12). The ion guide (9), preferably implemented as an octopole rod system, can guide both positive and negative ions to the ion trap.

While the invention has been shown and described with reference to a number of embodiments thereof, it will be recognized by those skilled in the art that various changes in form and detail may be made herein without departing from the spirit and scope of the invention as defined by the appended claims.

In order to record interpretable fragment ion spectra of the high-molecular substance ions that are only generated with multiple charges in suitable ion sources, such as electrospraying, it is necessary to convert the highly charged analyte ions, or the similarly highly charged fragment ions, into ions of low charge by means of multi-stage deprotonation.

When using electron transfer dissociation to generate the fragment ions, the method according to the invention for deprotonation of the analyte ions with multiple positive charges prior to dissociation, or of the highly charged fragment ions after dissociation, by reactions with non-radical anions can be characterized in that both the radical anions for the electron transfer dissociation and also the non-radical anions for the deprotonation are generated in the same ion source, from the same substance or mixture of substances.

A normal electron attachment ion source can be used to generate both types of anion. In this case, the process of thermalizing the injected electrons so that slow electrons for electron attachment are obtained requires the use of a gas, such as methane or another hydrogen-rich organic gas, which also generates hydrogen radicals when bombarded by electrons. Our investigations have shown that it is then only necessary to modify the voltage used for extracting the anions in order to obtain the one or the other kind of anion. The mechanism that results in the delivery of one or the other type of ion has not yet been explained.

One possible mechanism for the preferential formation of a non-radical anion $(M+H)^-$ and its extraction from an ion source for negative chemical ionization is the reaction between atomic hydrogen, which is formed as a byproduct in the ion source for negative chemical ionization using methane as a thermalizing gas, and the radical anion $M^{*-}$. The activation energy for a collision reaction of this kind between two gaseous radical particles, the radical anion on the one hand and the hydrogen atom on the other hand, can, we believe, be supplied by increasing the potential drop between the outlet from the ionization source and the inlet into the extraction diaphragm. Due to this collision process between the two radical particles, the radical anion of, for instance, fluoranthene formed in the ion source is converted into a non-radical anion.

The chemical valences of the resulting non-radical anions $(M+H)^-$ are saturated. Electron transfer, which is particularly favored in the case of radical anions due to their unsaturated valences, does not take place when non-radical anions are used. The non-radical anion does, however, have a high proton affinity, which is particularly suitable for the deprotonation of multiply charged cations.

Figure 3:
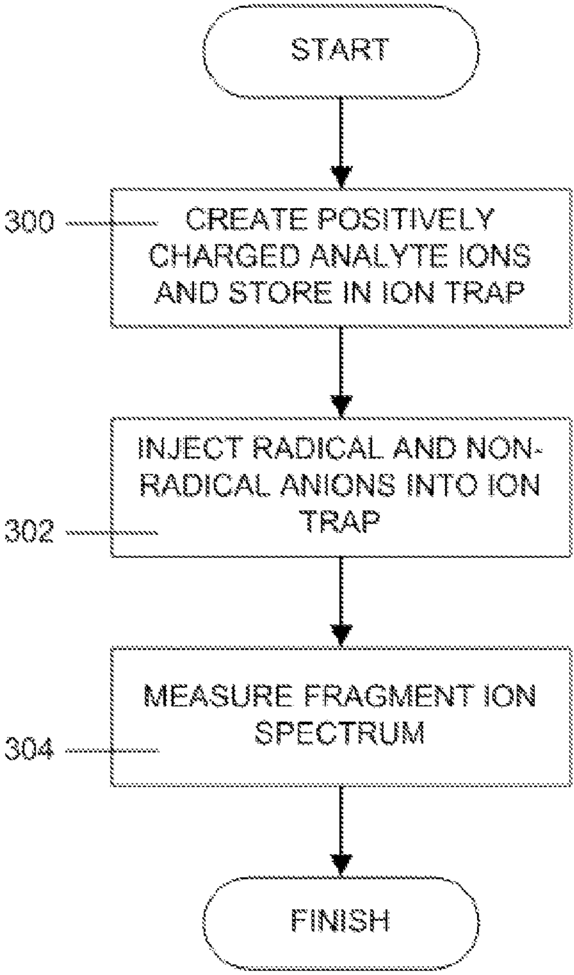
FIG. 3 is a flowchart showing the steps in an illustrative process for recording easily interpreted fragment ion spectra of highly charged analyte ions from a high-molecular analyte substance according to the principles of the invention.

A method according to the invention for recording easily interpreted fragment ion spectra of highly charged analyte ions from a high-molecular analyte substance can be broken down into the following steps, which are illustrated in FIG. 3:

a) creation of the positively charged analyte ions from the analyte substance, and storage of analyte ions in the ion trap (step 300), b) injection of radical anions for electron transfer dissociation, and of non-radical anions for deprotonation into the ion trap, where both types of anions are produced from the same reactant substance, or from the same mixture of reactant substances, in the same electron attachment ion source (step 302), and c) measurement of the fragment ion spectrum (step 304).

If the quantities of each of the types of ion stored in steps a) and b) are correctly chosen, step c) yields an easily interpreted fragment ion spectrum, since the ion trap then contains almost exclusively fragment ions of the analyte substance that have a mixture of desirable low charge levels, and only a few low-intensity ions of internal fragments.

The generation of the ions in step a) is preferably achieved by electrospray ionization because this generates multiply charged ions, as are required for electron transfer dissociation. However, this inevitably means that high-molecular biomolecules will give rise to highly charged analyte ions, and these, in turn, will yield highly charged fragment ions.

If electron transfer dissociation were carried out alone, without deprotonation, it would no longer be possible to resolve the isotope pattern of these highly charged fragment ions if ion traps are used as mass analyzers. It would therefore no longer be possible to establish the charge level to which the fragment ions belong. Since it is the large fragment ions in particular that carry multiple charges, all the fragment ions in the m/z range from about 500 to 1500 daltons would crowd together, as can be seen from FIG. 6. Evaluation and analysis of the fragment spectra would become extraordinarily difficult because the superimposition of the unresolved isotope patterns could not be separated by calculation.

Even if very high-resolution mass analyzers are used, the large number of fragment ions of different types and different charge levels crowding the small m/z range would create such a dense superimposition of the isotope patterns that deconvolution of the isotope groups would be made extremely difficult or even impossible. Electron transfer dissociation alone simply does not supply easily interpretable fragment ion spectra.

Evaluating the mass spectra is, on the other hand, relatively easy, regardless of the type of mass analyzer, if either the analyte ions prior to fragmentation or the fragment ions are converted to ions with significantly reduced charge levels by multi-stage deprotonation. These ions are then fewer in number and, at the same time, extend over a significantly greater m/z range. This equalization of the mass spectrum by partial deprotonation can easily be seen in FIG. 7. The mass spectrum extends now both to small values of m/z (150 daltons), where almost all the fragment ions have single charges, up to the limit of the m/z range of the ion trap mass spectrometer used here, at 3000 daltons, where the majority of the ions carry three or four charges.

Instead of electrospraying, other methods of ionization can be used if they generate multiply charged ions, such as ionization of surface-bound analyte samples by bombardment with highly charged molecule clusters. Here again, multiply charged ions are generated from large biomolecules.

Figure 4:
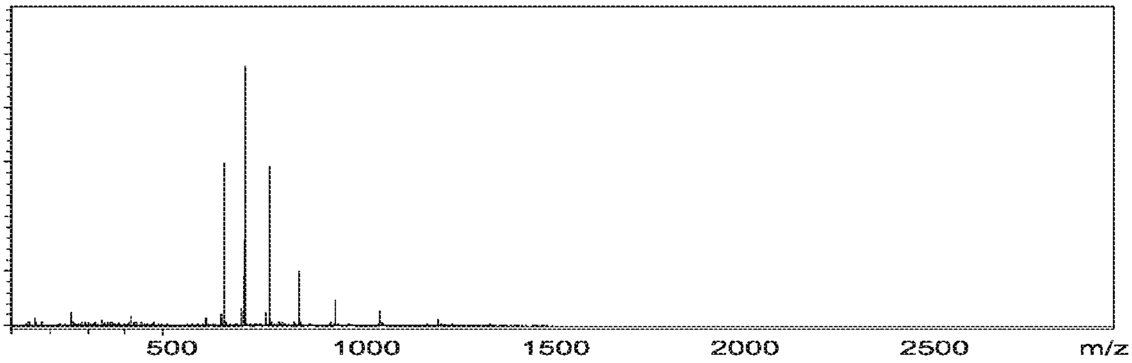
FIG. 4 illustrates the analyte ions generated by spraying ubiquitin (molecular mass 8560 daltons). The ions have between 7 and 14 charges, analyte ions with 12 charges being the most common.
Figure 5:
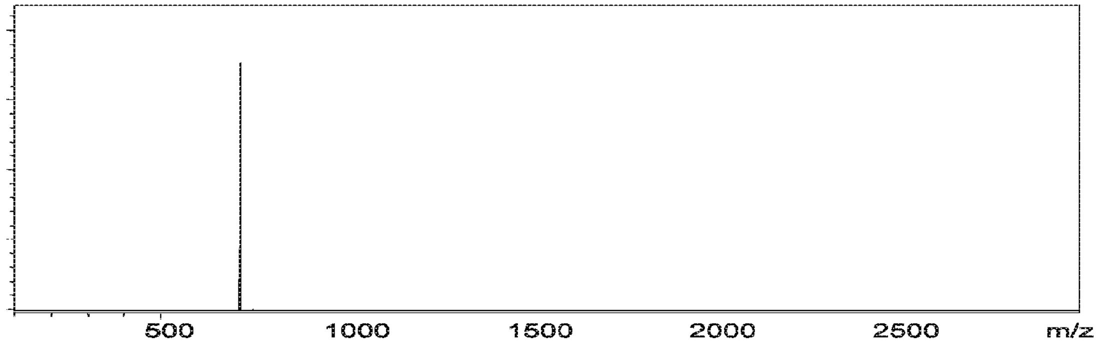
FIG. 5 illustrates a mass spectrum of the isolated ubiquitin ions with 12 charges, selected as parent ions.

The analyte ions collected in step a) can only be used for fragmentation without the need for further processing if no ions of other substances are also present in the ion trap. If necessary, step a) can be followed by the isolation of selected parent ion types of the analyte ions in the ion trap by the application of known methods. It is possible here to primarily isolate the analyte ions of one particular charge level, for instance only those carrying 10 charges, in the ion trap; but it is also possible to isolate analyte ions carrying different numbers of charges, for instance between 10 and 15 charges, in the ion trap. FIG. 5 illustrates the isolation of ubiquitin ions carrying 12 charges from the mixture of ubiquitin ions carrying between 7 and 14 charges in FIG. 4, using known methods.

It is possible to perform deprotonation on the highly charged analyte ions that have varying levels of charge, but to halt at a particular charge level, so that all the analyte ions with higher levels of charge are collected at this particular charge level. To do this, it is only necessary to apply light resonant excitation by means of a dipolar alternating voltage at the mass-to-charge ratio m/z for this charge level of the analyte ions. The ions that are in forced oscillation are then no longer able to participate in further reactions with the deprotonation reactant anions, as deprotonation requires a degree of quiescence. Converting highly charged analyte ions of various charge levels to a specified level of charge that is favorable for fragmentation brings, at the same time, a high sensitivity, as the analyte ions of all the higher charge levels accumulate at the chosen charge level during the deprotonation process. Furthermore, if highly charged ions of a number of substances are present, it is also possible in this way to select only the analyte ions, as the ions of the other substances are not collected, but undergo deprotonation to the end.

It is important that the isolation process holds all the ions of the isotope pattern in the ion trap because the isotope pattern of the fragment ions provides information about the level of charge and mass of the monoisotopic ions, and this information is important for further processing of the mass spectra. The monoisotopic signal belongs to the ion in an isotope pattern that consists only of the primary isotopes $^{1}H$, $^{12}C$, $^{14}N$, $^{16}O$, $^{31}P$ and $^{32}S$. For large proteins, the intensity of this monoisotopic signal is very small, and can only be derived from the other signals in the isotope group.

In step b) suitable radical anions $M^{*-}$ for the electron transfer dissociation, and non-radical anions for deprotonation are introduced into the ion trap. It is possible to introduce both types of anion as a mixture, or to introduce them one after the other. It is thus entirely appropriate for the electron transfer dissociation to be carried out first, followed by the deprotonation; but it is also possible for deprotonation of the highly charged analyte ions to be carried out first, before the partially deprotonated analyte ions are dissociated by electron transfer reactions. Both these processes can, however, run in parallel. The result is largely the same.

The non-radical anions can, for instance, have the form $(M+H)^{-}$, or they may take the form $(M-H)^{-}$. The electron attachment ion source we use supplies ions of the form $(M+H)^{-}$.

Figure 6:
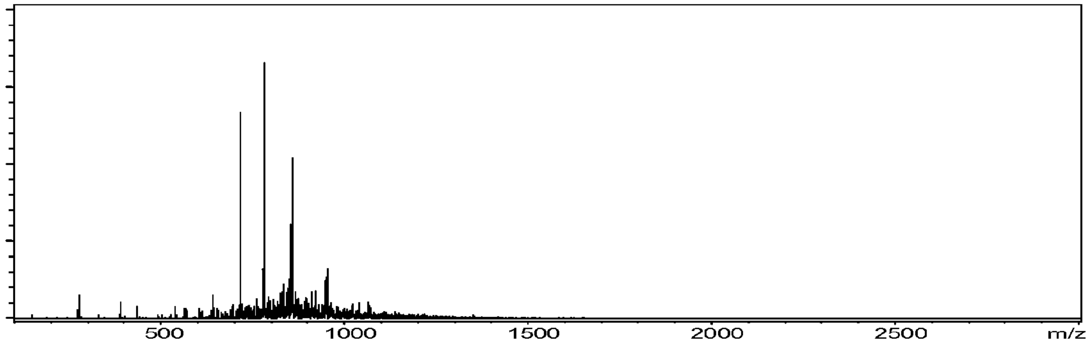
FIG. 6 shows the fragment ion spectrum obtained from the ubiquitin ions with 12 charges by electron transfer dissociation in reactions with radical anions of the fluoranthene, where the radical anions of the fluoranthene were generated in the electron attachment ion source (8). The majority of fragment ions are in the range between 500 daltons and 1500 daltons.

Suitable radical anions $M^{*-}$ for electron transfer dissociation are produced by electron attachment to appropriate reactant substances. As is known, reactant substances of various types can be used, including fluoranthene, fluorenone, anthracene or other polyaromatic compounds. It is also possible, in principle, to use a mixture of reactant substances in order to generate a mixture of radical anions. The radical anion of fluoranthene was used for the fragmentation of the ubiquitin, whose fragment ion spectrum is illustrated in FIG. 6.

The transfer of a predetermined quantity of radical anions into the ion trap in step b) can also be combined with the selection of particular ions, if, for instance, the desired mixture ratio cannot be achieved in the ion trap, or if other unwanted ion types are also present. This filtering can, for instance, be implemented by means of a quadrupole filter mounted between the electron attachment ion source and the ion trap. Unwanted ions can, however, also be removed at the storage stage, for instance by means of resonant excitation at their secular oscillation frequency to prevent their storage.

According to our investigations with the electron attachment ion source, however, the radical anions of fluoranthene can be supplied in a very pure state, with no measurable presence of non-radical anions. But even if this were not the case, the inclusion of small quantities of non-radical anions could easily be tolerated, as they would already cause deprotonation of a small proportion of the fragment and parent ions, which would not be harmful here.

If too many radical anions are introduced into the ion trap in step b), the excess radical anions can be removed again after a predetermined reaction time has elapsed. A high excess of the radical anions in relation to the analyte ions is frequently introduced into the ion trap in order to shorten the reaction time required for electron transfer dissociation. For that reason, there are so many radical anions in the ion trap that electron transfer dissociations of multiply charged fragment ions could also occur on a large scale once large numbers of fragment ions have been formed. This would create ions of so-called “internal fragments”, which would make evaluation of the fragment ion spectra more difficult. It is therefore necessary to interrupt the electron transfer dissociation reactions after a predetermined reaction time by removing the radical anions. The reaction time should be selected so that a certain percentage of fragmented parent ions is not exceeded, 30 or 50 percent, for instance. Depending on how many radical anions have been introduced, the electron transfer dissociation can be interrupted after 5 to 30 milliseconds.

The radical anions can be removed from the ion trap by a variety of known methods, for instance by resonant ejection, which is preferably used here. It is also, however, possible to remove the radical anions by changing the RF voltage at the ion trap, so creating conditions under which the storage of the radical anions is unstable, as a result of which they leave the ion trap. The last method is, however, only possible if there are no interesting fragment ions in the ion trap that are lighter than those of the radical anions.

Similar considerations apply to the non-radical anions for the deprotonation process. They too can be introduced in excess and removed again after a predetermined reaction time has elapsed, in order to arrive at the correct mixture of fragment ions with low levels of charge.

Figure 2:
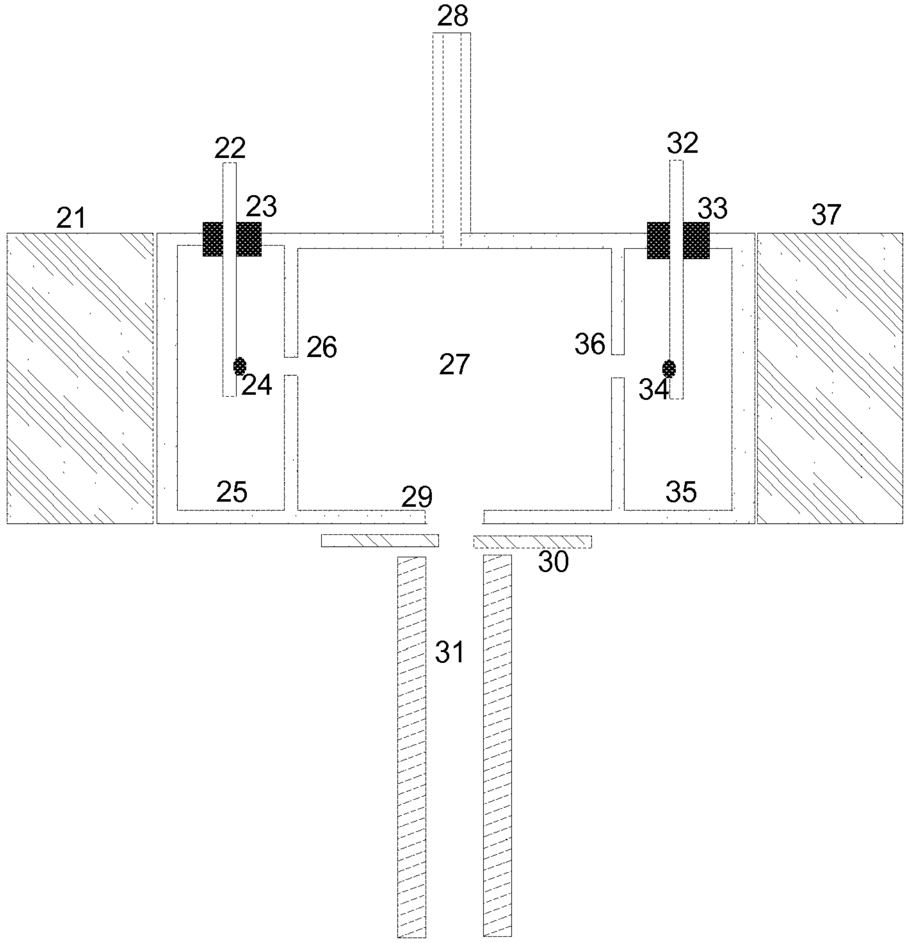
FIG. 2 shows an electron attachment ion source in which a beam of electrons leaving the thermionic cathode (24) is guided into the chamber (27) by two magnets (21) and (37), and ionizes the gaseous fluoranthene, which enters through the feed duct (28), in the presence of methane. The ions that result are extracted from the opening (29) with the aid of the extraction diaphragm (30) and introduced into the hexapole ion guide (31). When the extraction voltage is low, radical anions are almost exclusively extracted, whereas a higher extraction voltage predominantly extracts only non-radical anions.

A favorable electron attachment ion source is illustrated in FIG. 2. A beam of electrons leaves the thermionic cathode (24) on mounting posts (22) with an energy of about 70 electron-volts, and is guided by two magnets (21) and (37) through the chamber (27). In the chamber (27), the gaseous fluoranthene entering through the feed duct (28) is ionized in the presence of methane, which also enters through the feed duct (28). The resulting anions are extracted through the opening (29) of the chamber (27) with the aid of the extraction diaphragm (30) and introduced into a hexapole ion guide (31). When the extraction voltage is low, radical anions are almost exclusively extracted, whereas a higher extraction voltage predominantly extracts only non-radical anions. The electron attachment ion source and hexapole ion guide (31) correspond to the ion source (8) and the ion guide (7) in FIG. 1. The thermionic cathode (34) on mounting posts (32), held by insulators (33) in chamber (35), is a reserve emitter, capable to emit a second electron beam through opening (36) into the ionization chamber (27).

The electron attachment ion source is adjusted in step b) in such a way that it delivers the desired type of anions, which is to say either the radical anions for the electron transfer dissociation, the non-radical anions for the deprotonation, or a mixture of both. Experience with the ion source we have developed shows that in the electron attachment ion source, which operates with methane as the thermalization gas and fluoranthene as the initial substance for the anions, the anions can be extracted by adjusting the extraction voltage at the aperture of the diaphragm (30). Whereas an extraction voltage of about −6 volts extracts almost exclusively radical anions, lowering this voltage to −15 volts leads to the extraction of around 90 percent non-radical anions. A mixture of any desired ratio between these can be obtained by adjustment. When the non-radical anions are supplied, the total yield of anions is reduced, but this is easy to compensate for by allowing a longer time for storing them in the ion trap.

Deprotonation of the highly charged analyte or fragment ions is extremely fast at first because the reaction cross-section is approximately proportional to the square of the number of charges on an ion. Ions carrying ten charges therefore undergo deprotonation about one hundred times faster than singly charged ions; even doubly charged ions undergo deprotonation some four times faster than singly charged ions. If enough non-radical anions are introduced into the ion trap, then after a certain reaction time the ion trap will contain almost exclusively singly charged ions. Although, in the meantime, some singly charged ions have also undergone deprotonation and are therefore lost, the loss is limited, and can be compensated for by some overfilling the ion source initially.

Deprotonation down to singly charged ions is, however, not at all optimal here because in the case of proteins, for instance, significantly better sequence coverage can be achieved if the deprotonation is only carried out until a mixture of ions of low charge levels is obtained. Deprotonation is only required up to a point where, on the one hand, isotopes can be resolved in the mass spectrometer measurements and, on the other hand, the fragment ion spectrum is equalized sufficiently to permit deconvolution of superimposed isotope patterns of the fragment ions. This equalization of a fragment ion spectrum by deprotonation can be seen, taking the example of ubiquitin, in FIGS. 6 and 7.

Figure 7:
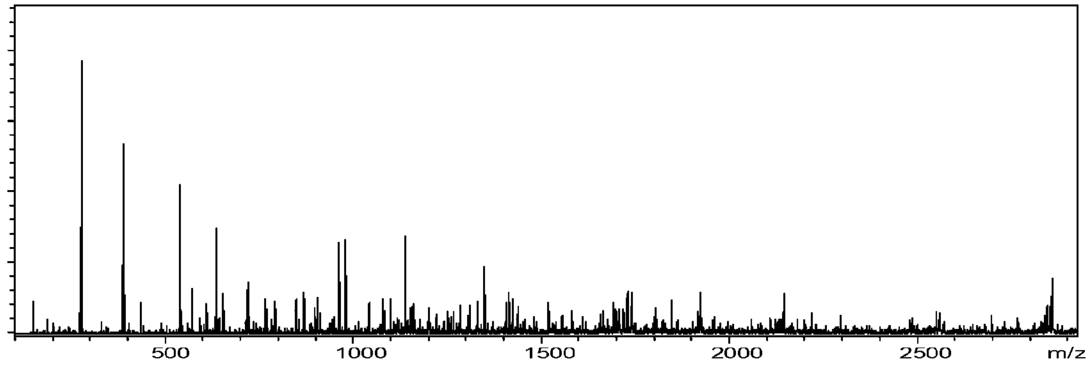
FIG. 7 shows a mass spectrum of the fragment ions, with a largely reduced charge, of the ubiquitin from FIG. 6; the highly charged fragment ions have undergone deprotonation by non-radical anions of fluoranthene to create a mixture with between one and four charges. The mass spectrum is substantially equalized, and covers the m/z range from 150 to 3000 daltons relatively evenly. The non-radical fluoranthene anions were, according to the invention, obtained in the same ion source (8) that was used to generate the radical anions, by changing the operating voltages.
Figure 8:
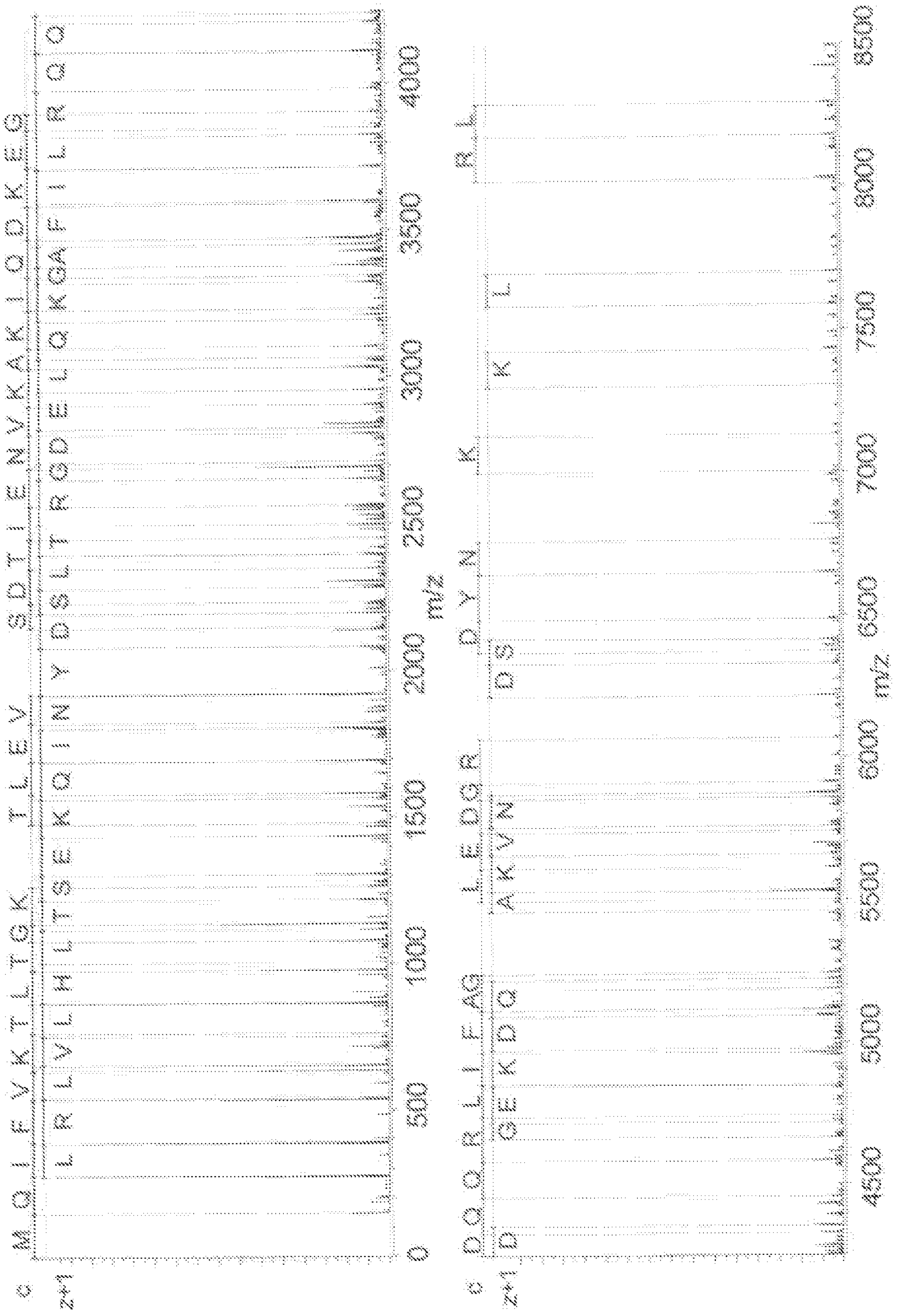
FIG. 8 shows a virtual mass spectrum of ubiquitin, computed from the reduced-charge mass spectrum of FIG. 7, and containing the annotations of the amino acids in the ubiquitin. The annotations were added by an automatic computation program that first performed identification using a search engine for protein sequence databases.

FIG. 8 illustrates a fragment ion spectrum for ubiquitin that has been obtained from the spectrum of FIG. 7 by computing the spectrum for the singly charged monoisotopic ions only. A spectrum of this sort is ideal for further processing, for instance for identification by a search engine in a protein sequence database, or for the purposes of annotation of the amino acid sequence, as illustrated in FIG. 8.

After step b), it can also be favorable to remove a proportion of the remaining parent ions, which are also now present at low levels of charge, and which still represent by far the largest proportion of the contents of the ion trap. This increases the dynamic measuring range of the ion trap, and the spectrum of fragment ions emerges more clearly. The loss of ions in the ion trap can again here be compensated for by initially overfilling the ion trap with analyte ions.

In the final step c), the mass spectrum of the fragment ions from the analyte substance, which now only remain with low levels of charge, is measured by the mass spectrometer. This measurement can be carried out by usual scanning procedures of the ion trap itself. The ion trap is therefore used as a mass analyzer. It can, however, also be carried out in other types of analyzer to which the ion trap is coupled to form a mass spectrometer.

If the ion trap is used as the mass analyzer, this measurement of the fragment ion spectrum can be influenced by the number of ions in the ion trap: if the number of ions is too high, the resolution of the ion trap deteriorates, but if the number is too low, the quality of the spectrum suffers because the signal-to-noise ratio is too low. It is therefore important to ensure that the ion trap is filled with an adequate number of analyte ions at the beginning of the process. The intermediate steps do not suffer from overfilling; that is only a problem at the final stage c) of recording the spectrum.

A favorable embodiment of an ion trap mass spectrometer according to this invention, suitable for carrying out a method according to the invention, is shown schematically in FIG. 1. An electrospray ion source (1) with a spray capillary (2) is used here outside the mass spectrometer to ionize biomolecules. It is assumed, here, that a medium-size protein such as ubiquitin is to be examined. The ions are guided here in the usual way through an inlet capillary (3) and a skimmer (4) with the ion guides (5) and (9) through the pressure stages (15), (16), (17), into a 3D ion trap with end cap electrodes (11 and 13) and a ring electrode (12), where they are trapped in the usual way. The ion guides (5) and (9) consist of parallel pairs of rods to which alternating phases of an RF voltage are applied. They can be implemented as quadrupole, hexapole or octopole rod systems.

A first mass spectrum, obtained by resonant excitation of the ions with mass-selective ejection and measurement in the ion detector (14) provides an overview of the various charge levels of the analyte ions. If it is now desired to investigate the sequence of amino acids in one or more types of analyte ion with various levels of charge, the usual methods are used to isolate the ions that have the desired charge levels. FIG. 4 illustrates the ubiquitin ions with varying charge levels between 7 and 14, while FIG. 5 shows the isolated ubiquitin ions with 12 charges obtained from this. In other words, the ion trap is initially overfilled, after which all the ions except for the desired parent ions are removed from the ion trap.

These ubiquitin ions with 12 charges are then damped and brought to the center of the trap during a brief waiting time of a few milliseconds by the action of the collision gas, which is always present. There they form a small cloud with a diameter of about 1 millimeter.

At this stage the negatively charged ions are added. These ions are generated here in a separate electron attachment ion source (8) for negative chemical ionization, and channeled through a small ion guide (7) to an ion selector, where they are inserted into the ion guide (9) to the ion trap (11, 12, 13). In the embodiment illustrated, the ion selector consists simply of an apertured diaphragm (6) to which a suitable DC potential is applied, and with shortening of two of the rods which make up the ion guide (9). For this very simple type of ion selector, it is particularly favorable for the ion guide to be implemented as an octopole system. With suitable voltages applied to the diaphragm, this ion selector can allow the ions from the electrospray ion source (1, 2) through unhindered, while with other voltages, the negative ions from the ion source (8) are reflected into the ion guide (9). They reach the ion trap through this ion guide (9), and are held there in the usual way by an injection lens (10). Once there, they react immediately (within a few milliseconds) with the positive ions.

Sometimes the transfer of an electron also causes the formation of stable radical cations that do not immediately decompose. Although this risk is not particularly large for highly charged analyte ions, it can nevertheless be counteracted if a single type of parent ion is selected. For this purpose, a weak, dipolar, alternating excitation voltage is applied to the two end caps (11, 13) of the ion trap to produce resonant excitation to these radical cations. The frequency required for this alternating excitation voltage can be calculated from the known mass of these radical cations and from their known charge. The effect of this excitation voltage is to raise the yield of the desired ion types.

The creation of both types of anions for dissociation and for deprotonation from the same substance in the same ion source according to the invention has the advantage that commercially available ion trap mass spectrometers that incorporate an ion source of this type can be used without any modification for operation in accordance with the invention, simply by installing appropriate control software.

A variety of methods are known for calculating the times required for optimally filling the ion trap with highly charged analyte ions at the beginning of the process chain; these will not be described in any greater detail here. The appropriate filling times achieve optimum filling in which the space charge falls just short of disturbing the actual recording of the fragment ion spectra. This essentially involves controlling the number of charges within the ion trap; other parameters do play a part in achieving optimum behavior when recording the spectra, but their details will not be considered here. An optimum time for filling with negative ions, on the other hand, only has to be determined once, as approximately the same quantity of negative ions is always required to react optimally with the fixed number of positive ions.

With knowledge of this invention, the specialist will also be able to develop further procedures that extend and complete his investigation of the structures of the substances under analysis. For instance, granddaughter ions can be generated from the fragment ions thus created, again using collision-induced fragmentation or electron transfer dissociation. All such solutions should be covered by the basic idea of the invention.

What is claimed is:

1. A method for measuring the mass spectra of fragment ions using electron transfer dissociation of analyte ions by means of reactions with radical anions and also partial deprotonation of the analyte ions or the fragment ions by means of reactions with non-radical anions, wherein both the radical anions for electron transfer dissociation and the non-radical anions for deprotonation are created in the same ion source from the same substance or the same mixture of substances.

2. The method according to claim 1, wherein an electron attachment ion source is used to generate both the radical anions and the non-radical anions, and wherein operating voltages of the electron attachment ion source are changed in order to supply the radical anions and the non-radical anions.

3. The method according to claim 2, wherein an operating voltage for extracting the anions from the electron attachment ion source is varied in order to vary a ratio between the radical anions and the non-radical anions supplied by the electron attachment source.

4. The method according to claim 1, wherein a hydrogen-rich gas is introduced into the electron attachment ion source to thermalize electrons injected into the electron attachment source.

5. The method according to claim 4, wherein the hydrogen-rich gas comprises methane.

6. A method for measuring a spectrum of partially deprotonated fragment ions produced from ions of an analyte substance, the latter ions having multiple positive charges that have been created by electron transfer dissociation in a mass spectrometer with an RF ion trap, comprising:

a) creating positively charged analyte ions from the analyte substance, and storing the analyte ions in the RF ion trap;

b) producing radical anions and non-radical anions from a single reactant substance or a single mixture of reactant substances within a single electron attachment ion source and providing the radical anions and the non-radical anions to the RF ion trap for electron transfer dissociation and for deprotonation, respectively, and c) measuring the fragment ion spectrum.

7. The method according to claim 6, wherein step (a) comprises creating the analyte ions by electrospray ionization.

8. The method according to claim 6, wherein after step (a) the analyte ions are subjected to deprotonation that is halted at a predetermined charge level.

9. The method according to claim 6, wherein after step (a) selected parent ions are isolated for fragmentation.

10. The method according to claim 6, wherein step (b) comprises introducing the radical anions for electron transfer dissociation and the non-radical anions for deprotonation into the ion trap sequentially in time.

11. The method according to claim 10, wherein step (b) comprises introducing the radical anions for electron transfer dissociation into the RF ion trap first and then introducing the non-radical anions for deprotonation into the RF trap after the radical anions have been introduced.

12. The method according to claim 11, wherein step (b) comprises fragmenting radical cations created from analyte ions by electron transfer by subjecting the radical cations to impacts with a collision gas in the RF ion trap in order to increase a yield of electron transfer fragment ions.

13. The method according to claim 12, wherein step (b) comprises subjecting the radical cations to impacts with the collision gas by exciting the radical cations with a dipolar alternating voltage that is radiated into the trap.

14. The method according to claim 10, wherein step (b) comprises introducing the non-radical anions for deprotonation into the RF ion trap first, and then introducing the radical anions for electron transfer dissociation into the RF ion trap after the non-radical anions have been introduced.

15. The method according to claim 6, wherein step (b) comprises introducing the radical anions for electron transfer dissociation and the non-radical anions for deprotonation into the RF ion trap simultaneously as a mixture.

16. The method according to claim 15, wherein step (b) comprises adjusting the electron attachment ion source so that a predetermined mixture of radical anions and non-radical anions is produced.

17. The method according to claim 16, wherein step (b) comprises adjusting a ratio between the radical anions and the non-radical anions in the mixture by changing the operating conditions of the electron attachment ion source.

18. The method according to claim 17, wherein step (b) comprises changing the operating conditions of the electron attachment ion source by changing a voltage used for extraction of the radical anions and the non-radical anions.

19. The method according to claim 6, wherein step (b) comprises introducing at least one of the radical anions and the non-radical anions into the RF ion trap in numbers that exceed the number of analyte ions in the RF trap, and removing radical anions and non-radical anions remaining in the RF ion trap a predetermined reaction time has elapsed.

20. The method according to claim 6, wherein the RF ion trap is a 2D or 3D ion trap.

* * * * *